(12) United States Patent
Chao et al.

(10) Patent No.: US 7,526,807 B2
(45) Date of Patent: Apr. 28, 2009

(54) DISTRIBUTED ARCHITECTURE FOR STATISTICAL OVERLOAD CONTROL AGAINST DISTRIBUTED DENIAL OF SERVICE ATTACKS

(75) Inventors: Hung-Hsiang Jonathan Chao, Holmdel, NJ (US); Mooi Choo Chuah, Marlboro, NJ (US); Yoohwan Kim, Folsom, CA (US); Wing Cheong Lau, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1028 days.

(21) Appl. No.: 10/723,450

(22) Filed: Nov. 26, 2003

(65) Prior Publication Data

US 2005/0111367 A1 May 26, 2005

(51) Int. Cl.
*G06F 21/00* (2006.01)
(52) U.S. Cl. ...................................... 726/23
(58) Field of Classification Search ............... 726/22, 726/23
See application file for complete search history.

(56) References Cited

U.S. PATENT DOCUMENTS

2004/0062199 A1* 4/2004 Lau et al. .................... 370/230
2004/0250124 A1* 12/2004 Chesla et al. ............... 713/201

OTHER PUBLICATIONS

B. Babcock, S. Babu, M. Datar, R. Motwani, and J. Widom, "Models and Issues in Data Stream Systems," In *Proceedings of the 21st ACM Symposium on Principles of Database Systems*, Jun. 2002.

F. Chen, D. Lambert and J.C. Pinheiro, "Incremental Quantile Estimation for Massive Tracking," In *Proceedings of the 6th International Conference in Knowledge Discovery and Data Mining*, Aug. 2000.

C. Estan, G. Varghese, and M. Fisk, "Counting the number of active flows on a high speed link," *ACM Computer Communication Review*, vol. 32, No. 3, Jul. 2002.

J. Forristal, "Fireproofing against DoS Attack," *Network Computing*, Dec. 10, 2001, http://www.networkcomputing.com/1225/1225f3.html.

A.C. Gilbert, Y. Kotidis, S. Muthukrishnan, and M.J. Strauss, "How to Summarize the Universe: Dynamic Maintenance of Quantiles," In *Proceedings of the 28th VLDB Conference*, Aug. 2002.

(Continued)

*Primary Examiner*—Gilberto Barron, Jr.
*Assistant Examiner*—Cordelia Kane

(57) ABSTRACT

In a network including a centralized controller and a plurality of routers forming a security perimeter, a method for selectively discarding packets during a distributed denial-of-service (DDoS) attack over the network. The method includes aggregating victim destination prefix lists and attack statistics associated with incoming packets received from the plurality of routers to confirm a DDoS attack victim, and aggregating packet attribute distribution frequencies for incoming victim related packets received from the plurality of security perimeter routers. Common scorebooks are generated from the aggregated packet attribute distribution frequencies and nominal traffic profiles, and local cumulative distribution function (CDF) of the local scores derived from the plurality of security perimeter routers are aggregated. A common discarding threshold is derived from the CDF and sent to each of the plurality of security perimeter routers, where the discarding threshold defines a condition in which an incoming packet may be discarded at the security perimeter.

28 Claims, 8 Drawing Sheets

OTHER PUBLICATIONS

M. Greenwald and S. Khanna, "Space-Efficient Online Computation of Quantile Summaries," In *Proceedings of Network and Distributed System Security Symposium*, Feb. 2002.

J. Jung, B. Krishnamurthy, and M. Rabinovich, "Flash Crowds and Denial of Service Attacks: Characterization and Implications for CDNs and Web Sites," In *Proceedings of the International World Wide Web Conference*, May 2002.

R.M. Karp, C.H. Papadimitriou, and S. Shenker, "A Simple Algorithm for Finding Frequent Elements in Streams and Bags," *ACM Transactions on Database Systems*, tentatively scheduled for the Mar. 2003.

S. Kasera, J. Pinheiro, C. Loader, M. Karaul, A. Hari, and T. LaPorta, "Fast and Robust Signaling Overload Control," In *Proceedings of 9th International Conference on Network Protocols (ICNP)*, Nov. 2001.

J. Mirkovic, G. Prier, and P. Reiher, "Attacking DDoS at the Source," In *Proceedings of 10th IEEE International Conference on Network Protocols*, Nov. 2002.

\* cited by examiner

DISTRIBUTED ARCHITECTURE FOR STATISTICAL OVERLOAD CONTROL AGAINST DISTRIBUTED DENIAL OF SERVICE ATTACKS

CROSS-REFERENCES

This patent application claims priority to commonly assigned U.S. patent application Ser. No. 10/232,660, filed Sep. 3, 2002, and commonly assigned U.S. patent application Ser. No. 10/261,299, filed Sep. 30, 2002, both of which are incorporated herein by reference in their entireties.

TECHNICAL FIELD

This invention pertains to the field of communication networks, and more specifically, to the field of prevention of distributed denial of service (DDoS) attacks in such networks.

BACKGROUND OF THE INVENTION

One of the threats in cyber security is the use of a distributed denial of service (DDoS) attack. In such an attack, a network device (commonly a server) is bombarded with IP packets in various forms (e.g., email, file transfers and ping/UDP/ICMP floods, and the like) from many sources, so that the network device (ND) is overloaded and rendered useless for normal operations. Typically, the participating sources are themselves victims because the offending instructions and codes were planted ahead of time via computer viruses to be activated simultaneously at some later date to overwhelm the ND. Traditional preventative methods, such as so-called "firewalls," are not effective against such attacks because such methods may only be programmed against known threats and the filtering is not responsive when normally acceptable IP packets begin causing problems within the network.

Generally, networks attempt to detect the onslaught of a DDoS attack and identify the servers and sub-networks under attack. Because it is not known ahead of time which ND will be attacked, all traffic going to all NDs needs to be monitored, generally by devices known as network processors (NP). Consequently, the scalability of such a monitoring process is of paramount concern because of the potentially large number of hosts and sub-networks needed to be protected and the high volume of traffic that needs to be examined by network processors in real-time.

If a monitoring process attempted to monitor and catalog every detail of every IP packet, the monitoring system would quickly become overwhelmed. Thus, to effectively prevent DDoS attacks, NPs must operate using a minimum number of states or traffic statistics in order to keep storage and computational requirements within a practical range.

Furthermore, since the attacks may originate from multiple sources (i.e., distributed attacks), such distributed source attacks are difficult to identify because of an inability to aggregate, correlate, and consolidate possible incidents occurring at routers residing along a security perimeter. In other word, instead of a single NP detecting an attack, slow attrition of packets though multiple NPs to the victim (i.e., the aggregation of attacking packets from multiple sources) may cause victim to be overwhelmed. Such distributed attacks from multiple sources are difficult to defend against, since once an unrealized distributed attack has converged upon the victim, it is already too late. Unfortunately, there are presently no efficient techniques used to aggregate, correlate, and consolidate packet traffic through the NPs along a security perimeter to defend against such DDoS attacks generated by a distributed and/or slow attrition of packets though multiple NPs to the victim.

Accordingly, there is need for highly efficient methods, as well as apparatus for detecting, identifying, and preventing distributed DDoS attacks.

SUMMARY OF THE INVENTION

The disadvantages heretofore associated with the prior art are overcome by the present invention of a method for selectively discarding packets during a distributed denial-of-service (DDoS) attack over a network, including a centralized controller and a plurality of routers forming a security perimeter. The method includes aggregating victim destination prefix lists and attack statistics associated with incoming packets received from the plurality of routers to confirm a DDoS attack victim, and aggregating packet attribute distribution frequencies for incoming victim related packets received from the plurality of security perimeter routers.

Common scorebooks are generated from the aggregated packet attribute distribution frequencies and nominal traffic profiles, and local cumulative distribution function (CDF) of the local scores derived from the plurality of security perimeter routers are aggregated. A common discarding threshold is derived from the CDF and sent to each of the plurality of security perimeter routers, where the discarding threshold defines a condition in which an incoming packet may be discarded at the security perimeter.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, when appropriate, to designate identical elements that are common to the figures.

DETAILED DESCRIPTION

Figure 1:
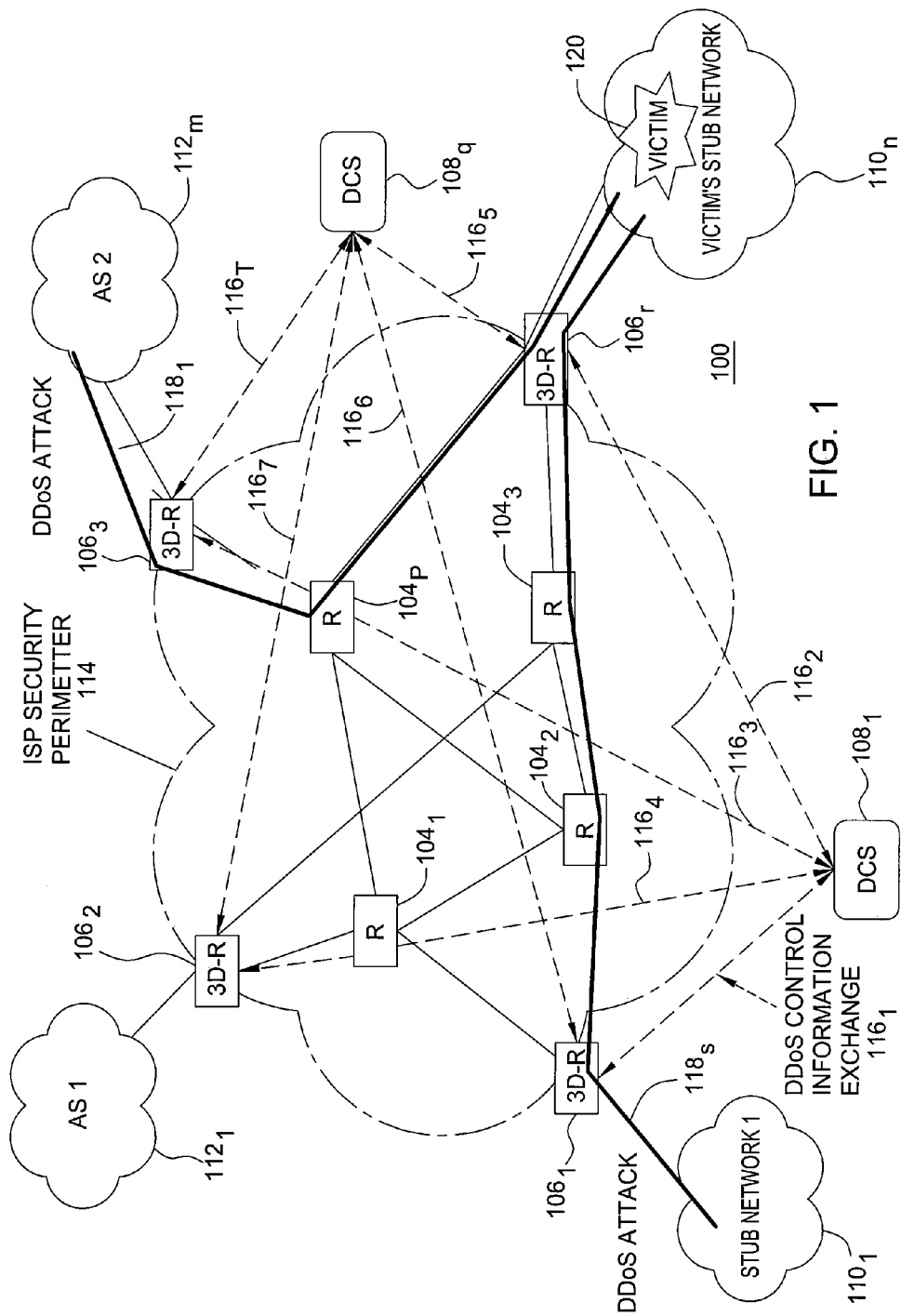
FIG. 1 depicts a simplified block diagram of a protected network device according to one embodiment of the invention.

The present invention provides for a distributed, adaptive Internet Protocol (IP) filtering system and technique to detect and block packets involved in a distributed denial of service (DDoS) attack. The present invention provides a DDoS distributed defense architecture and processes, which are based on distributed detection and automated on-line attack characterizations, where the function of detecting, as well as discarding suspicious packets are performed upstream from the victim, by a plurality of designated nodes forming a security perimeter. One process comprises three phases, which include (i) detecting, in the aggregation, the onset of an attack from multiple autonomous sources, and identifying the victim by monitoring aggregate traffic statistics (e.g., four key statistics) of each protected target, while keeping minimum per-target states; (ii) differentiating between legitimate and attacking packets destined towards the victim based on a Bayesian-theoretic metric of each packet (commonly known as a "Conditional Legitimate Probability" (CLP)); and (iii) discarding packets selectively by comparing the CLP of each packet with a dynamic threshold. The threshold is adjusted according to (1) the distribution of CLP of all suspicious packets and (2) the congestion level of the victim.

The technique implements a "PacketScore" approach because CLP may be viewed as a score that estimates the legitimacy of a suspicious packet. By taking a score-based filtering approach, the problems of conventional binary rule-based filtering are avoided. The score-based approach also enables the prioritization of different types of suspicious packets. Specifically, it is much more difficult, if not impossible, for rule-based filtering to support such prioritization. The ability to prioritize becomes even more important when a full characterization of the attacking packets becomes infeasible. By linking the CLP discard threshold to the congestion level of the victim, the present invention allows the victimized system to opportunistically accept more potentially legitimate traffic, as its capacity permits. By contrast, once a rule-based filtering mechanism is configured to discard a specific type of packets, it does so regardless of the victim utilization.

Although the present invention may be utilized in a variety of applications or devices, the operation of the present invention will be demonstrated by describing specific embodiments. One embodiment of the present invention envisions a filtering device to prevent the disablement of Internet network devices when an IP packet source sends an inordinate amount of IP packets such that network devices cannot function properly.

In this embodiment the inventive device includes a plurality of network processors, the protected network device is a server, and the source for the IP packets is a router. As one skilled in the art will appreciate, a network processor may take many forms and may be composed of several different types of devices, such as those described herein.

Under the distributed detection technique of the present invention, once an attack is detected, each network processor will perform distributed score-based filtering for the suspicious traffic under the control of a DDoS control server (DCS). Based on a dynamic thresholding mechanism against such score, the network processors perform selective packet discarding and overload control for the victim in a distributed manner. The DCS coordinates this distributed overload control process by adjusting the threshold dynamically based on the arrival rate of suspicious traffic and score distributions reported by different 3D-Rs. Referring now to the drawings such an embodiment of the invention will now be described in more detail.

FIG. 1 depicts a schematic diagram of a network environment 100 suitable for implementing the present invention. The network environment comprises at least one client network 110 to be protected, at least one network processor (e.g., network processors $106_1$ to $106_r$, where r equals and integer greater than 0, collectively network processors 106), a plurality of core routers e.g., core routers $104_1$ to $104_p$, where p equals and integer greater than 1, collectively core routers 104), at least one distributed denial-of-service control server (DCS) (e.g., DCS $108_1$ to $108_q$, where q equals and integer greater than 0, collectively DCS 108), and at least one autonomous source (AS) (e.g., AS $112_1$ to $112_m$, where m equals and integer greater than 0, collectively AS 112), such as a server or router remotely located from the network of the victim device.

The core routers 104 form part of an infrastructure of a network 100, such as the Internet, and may be arranged in partial and/or full meshed configurations, depending on design considerations. The client networks 110 may be "stub" networks, where packetized information either originates or terminates, but is not passed through to other networks, as is conventionally known in the art. Each stub network 110 comprises a network infrastructure, which may include one or more client servers, client devices (e.g., desktop computers, laptops, among others), firewalls, routers/switches, among other client related network devices. The present invention is discussed in terms of a distributed DDoS attack directed against one or more server devices (victims) in a stub network 110. However, a victim device 120 should not be considered as being limited to located only in a stub network 110 or comprising only a server.

In one embodiment, one or more network processors 106 may be situated so that a "security perimeter" 114 is established around one or more servers 120 in a stub network 110, thereby forming a "protected" network, such that at least one network processor 106 is between any router 112 outside the security perimeter 114 and any server 120 inside the security perimeter 114. In an alternative embodiment, the security perimeter is aligned with existing administrative boundaries in the context of Internet inter-domain routing. Thus, for example, a security perimeter may be established so that all servers connected with the domain name www.acme.com are within the protected network.

A security perimeter 114 may also be established so that the routers 104 are also contained within it. Such a security perimeter, with routers 100 within, allows for multiple security perimeters to be constructed in order to cover a network. Security perimeters may also be set up to cover multiple networks or to cover separate partition "zones" within a network. Security perimeters 114 may further be constructed in various manners so as to include concentric and non-intersecting coverage. Multiple security perimeters aid in the ability to identify, isolate and filter attacking IP packets. For a detailed understanding of exemplary security perimeters configurations (e.g., a plurality of ring shaped security perimeters), the reader is directed to commonly assigned U.S. patent application Ser. No. 10/232,660, filed Sep. 3, 2002.

As shown in FIG. 1, the network processors 106 are positioned upstream from the stub networks 110 and are adapted to detect and filter (discard) IP packets originating from one or more autonomous systems (i.e., sources) 112 and/or other stub networks 110 that are destined to a particular server 120. IP packets convey various forms of information and queries including email, file transfers, and ping/UDP/ICMP data. Those skilled in the art will appreciate that a network processor 200 is generally capable of processing IP packets as fast as it can receive them for links of OC3 or above rates (i.e., at a rate of hundreds of thousands of packets per second).

How the network processors 200 are configured also aids in determining the origination of an attack. By comparing the existence of suspicious flows (a flow being a series of IP packets and a suspicious flow being one that tends to ultimately be classified as an "attacking" flow) within certain zones, but not others, the originating source or autonomous systems 112 may be discovered. Once attacking flows are detected, the zone sizes are optionally dynamically adjusted or redefined through server or network processor action so as to aid in determining the exact location of an attacking router (not shown) in the AS 112. The network processors 106 using "conservation of flow concepts" are adapted to determine the location of identity of an attacker. For example, each processor 106 is adapted to detect when a flow travels through a particular zone without an increase in its suspicious flow.

Referring to FIG. 1, an exemplary victim server 120 of stub network 110$_n$ is illustratively shown being attacked from a plurality of sources, illustratively, along two paths 118$_1$ and 118$_s$, where s is an integer greater than 1. In particular, the attacking packets from the autonomous source 112 are routed to the victim based on the victim's destination address in each packet header. For example, a first stream of attacking packets is illustratively shown as being routed via the first exemplary path 118$_1$, which is illustratively formed by a first source router (not shown) originating in the second autonomous system AS2 112$_m$, and traverses through 3D-R 106$_3$, core router R 104$_p$, 3D-R 106$_r$, and into the stub network 110$_n$, where the first attacking packet stream is received by the victim server 120.

Similarly, a second stream of attacking packets is illustratively shown as being routed via the second exemplary path 118$_s$, which is illustratively formed by a second source router (not shown) originating at the first stub network 1 110$_1$, and traverses through 3D-R 106$_1$, core router R 104$_4$, core router R 104$_3$, 3D-R 106$_r$, and into stub network 110$_n$, where the second attacking packet stream is received by the victim server 120. Thus, the illustrative distributed attack is depicted as occurring along attack paths 118$_1$ and 118$_s$, such that the aggregate of the attacking packets (i.e., first and second streams) may incapacitate the victim device 120.

Distributed attack detection is realized via one or more DDoS control servers (DCSs) 108, which correlates and consolidates possible incidents reported by the network processors (routers) 106 residing along a security perimeter 114. The correlated and consolidated information is sent back to the network processors 106, where each of the NPs 106 perform detecting, differentiating, and discarding functions. For purposes of clarifying the invention, the network processors 106 are hereinafter referred to as "3D-Rs" 106, which means "Detecting-Differentiating-Discarding routers" 106. Once an attack victim is identified, the 3D-Rs 106 collaborate with the DCS 108 to perform a distributed, online characterization of the attacking traffic by comparing the fine-grain characteristics of the suspicious traffic with a nominal traffic profile of the victim.

Specifically, the result enables each 3D-R 106 to compute a "score", i.e., the "Conditional Legitimate Probability" (CLP), for each suspicious packet at wire-speed, which ranks the likelihood of the packet being an attacking packet, given the attribute values it carries, by using a Bayesian-theoretic approach. Based on a dynamic thresholding mechanism against such score, each of the 3D-Rs 106 perform selective packet discarding and overload control for the victim in a distributed manner. The DCS 108 coordinates this distributed overload control process by adjusting a threshold dynamically, based on the aggregate arrival rate of suspicious traffic and score distributions reported by different 3D-Rs 106 (e.g., using Bloom filter/leaky bucket arrays (BFLBA)).

One DDoS defense technique of the present invention is based on distributed detection and automated on-line attack characterization. The technique comprises three phases including: (i) detecting the onset of an attack and identify the victim by monitoring four key traffic statistics of each protected target while keeping minimum per-target states; and (ii) differentiating between legitimate and attacking packets destined towards the victim based on a readily-computed, Bayesian-theoretic metric (i.e., CLP) of each packet. The third phase (iii) is selectively discarding packets at each 3D-R 106 by comparing the CLP of each packet with a dynamic threshold. The threshold is adjusted according to (1) the distribution of conditional legitimate probability (CLP) of all suspicious packets and (2) the congestion level of the victim.

The DDoS technique is termed a "PacketScore" approach because CLP may be viewed as a score, which estimates the legitimacy of a suspicious packet. By taking a score-based filtering approach, the problems of conventional binary rule-based filtering is avoided. The score-based approach also enables the prioritization of different types of suspicious packets, as opposed to the rule-based filtering, which is much more difficult, if not impossible to use to support such prioritization. The ability to prioritize becomes even more important when a full characterization of the attacking packets becomes infeasible. By linking the CLP discard threshold to the congestion level of the victim, the packetscore approach allows the victim system to opportunistically accept more potentially legitimate traffic as its capacity permits. By contrast, once a rule-based filtering technique is configured to discard a specific type of packets, it does so regardless of the victim utilization.

For end-point attacks (i.e., victims 120 in a stub network 110), a scalable, distributed attack detection process is employed, illustratively using Bloom filter/leaky bucket arrays (BFLBA) to monitor key traffic statistics of each protected target. The BFLBAs allows simultaneously monitoring of such statistics for a large number of protected targets, while keeping minimal per-target state information.

FIG. 1 depicts the support of distributed detection and overload control by a set of 3D-Rs 106 and DCSs 108. Let r be the total number of 3D-Rs 106 along the security perimeter 114. The use of DCS 108 not only reduces the $O(r^2)$ peer communications among the 3D-Rs to $O(r)$, but it also spares the 3D-Rs 106 from the burden of managing a large number of per-end-point-target nominal traffic profiles. Since a DCS 108 exchanges only control messages with the 3D-Rs 106 via exchange paths 116, such control messages may be kept safely away from the normal data path, i.e., out of the reach of potential DDoS attack traffic. To facilitate load balancing and improve scalability, the set of potential end-point targets within a domain may be partitioned among multiple DCSs (e.g., DCS 108$_1$ and DCS 108$_q$, where q equals an integer greater than 1.

While there may be multiple DCSs 108 within a security perimeter 114 for load-balancing and fault-tolerant purposes, a single DCS (e.g., DCS 108$_q$) is designated as responsible for receiving all attack reports for any given destination network 110. Having a designated DCS 108 as a single report aggregation point not only consolidates the maintenance of per-destination traffic profile at the DCS 108, but it also eliminates the need of keeping different per-destination nominal profiles at each 3D-R 106.

A first objective of the present invention is to detect an onslaught of a DDoS attack, and then identify the victim networks (or network elements). Evidence of a DDoS attack include not only an abnormally high volume of traffic destined to (or forcing through) the victim, but also drastic changes in the traffic profile. Such profiling information may include the number of distinct flows observed over a given interval, average flow size, average flow holding time, packet size distribution, source address distribution, protocol mix, as well as other packet-header attribute distributions. Since it is impractical to continuously monitor all of the above statistics for all potential attack targets, the present invention focuses on estimating a set of key traffic statistics for each potential target. In one embodiment, four key traffic statistics are utilized, which include (1) the traffic arrival rate in packets per sec, (2) the arrival rate in bits per sec, (3) the number of active distinct flows observed over a given interval, and (4) the new flow arrival rate (in flow/sec).

The key statistics are measured and then compared against the corresponding nominal profile of the target. A possible DDoS attack is signified by any significant jump of these primary statistics. Once a possible attack is detected, all traffic destined to the corresponding target will be subject to finer-grain analysis and overload control.

It is noted that additional traffic metrics such as average flow size, average flow holding time, and average packet-size may readily be derived from the metrics specified above. The monitoring of flow-count statistics may be used for differentiating between a DDoS attack and a legitimate "Flash Crowd" overload, as both of these events will lead to abnormally high traffic volume. Flow-count statistics is also very effective for detecting the presence of source IP address spoofing often found during DDoS attacks.

For an end-point attack, a key challenge is to find out the identity of the victim among a large set of potential targets before substantial damages are realized. Once the victim endpoint or stub network 110 has been identified, it is straightforward to isolate the suspicious traffic (which contains both legitimate as well as attacking packets) for further analysis. This is because all the suspicious packets should bear the IP addresses or network prefix of the victim(s) as their destination addresses or prefixes.

Due to the large number of potential end-points or stub networks 110 to be protected within a security perimeter 114, it is infeasible to monitor traffic on a per destination host or per stub network basis. In one embodiment, multi-tier Bloom filter/leaky-bucket traffic measurement arrays (BFLBA) are utilized to detect significant jumps in the aforementioned key traffic statistics amongst a large number of potential endpoint attack targets, while keeping minimal per-target states.

In one embodiment of the present invention, each of the 3D-Rs 106 is adapted to detect abnormalities in communications traffic from routers outside the security perimeter 114 to servers 120 within security perimeters 114. Each 3D-Rs 106 may carry out this detection in a variety of ways. As envisioned by the present inventors, one embodiment comprises one or more 3D-Rs 106, each adapted to detect such abnormalities based on the Bloom Filters and Leaky-Bucket traffic measurement techniques, as discussed below with respect to FIGS. 2, 3A, and 3B.

Figure 2:
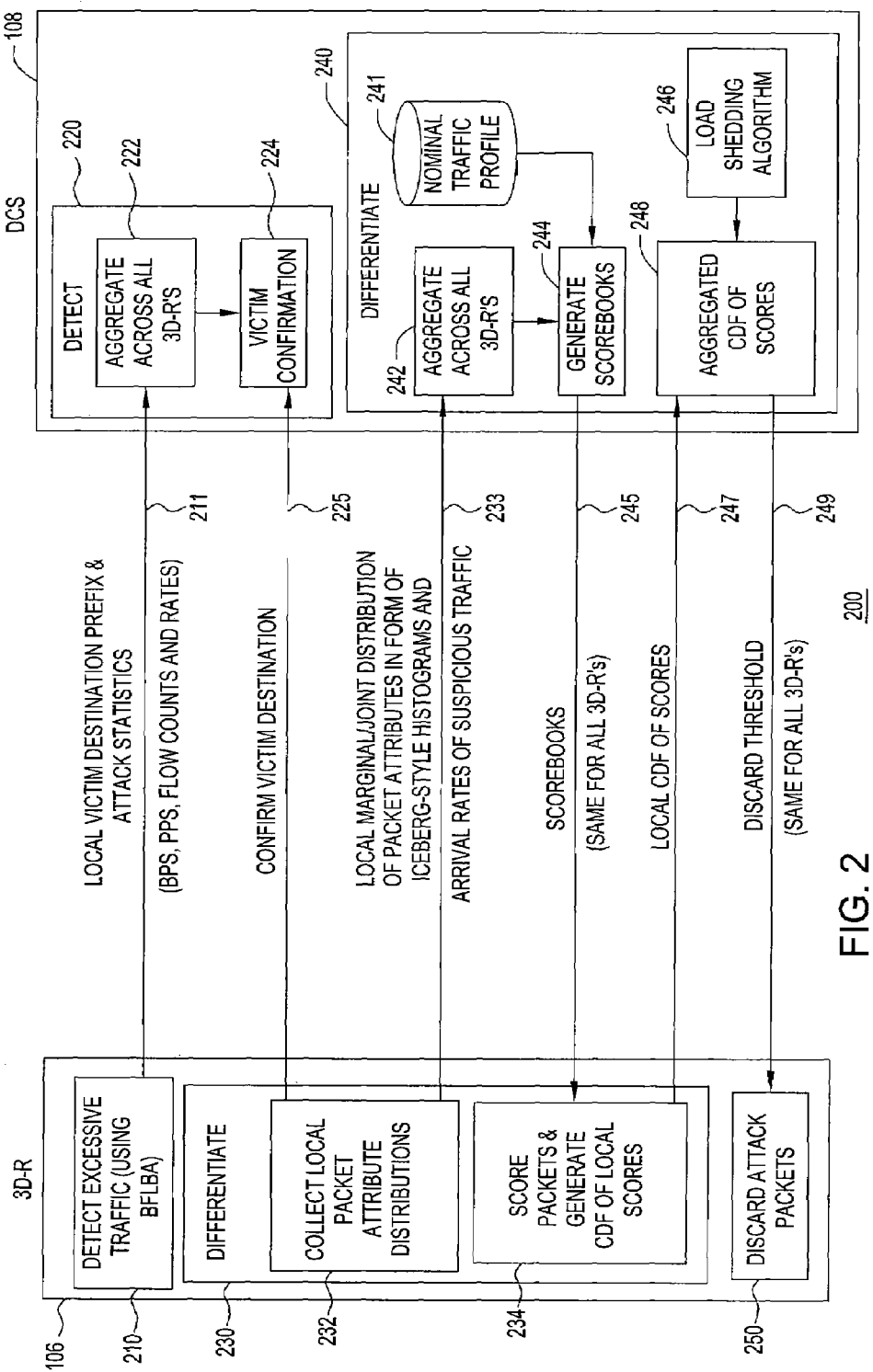
FIG. 2 depicts a flow diagram for performing distributed detection and overload control against a DDoS attack.

FIG. 2 depicts a flow diagram 200 for performing distributed detection and overload control against a DDoS attack. The flow diagram 200 is divided by functionality of the 3D-Rs 106 on the left and the DCS 108 on the right. FIG. 2 also shows the types of information to be exchanged between the 3D-Rs 106 and the DCS 108 throughout the different phases of distributed detection, fine-grain traffic profiling, packet differentiation, and selective packet discarding.

Under the distributed technique of the present invention, each 3D-R 106 will perform distributed score-based filtering for the suspicious traffic under the control of the DCS 108. Specifically, at step 210, each upstream 3D-R 106 detects excessive traffic, illustratively using Bloom filter/leaky bucket arrays (BFLBAs) 314, as discussed below with respect to FIGS. 3A and 3B and commonly assigned U.S. patent application Ser. No. 10/232,660, filed Sep. 3, 2002

Figure 3A:
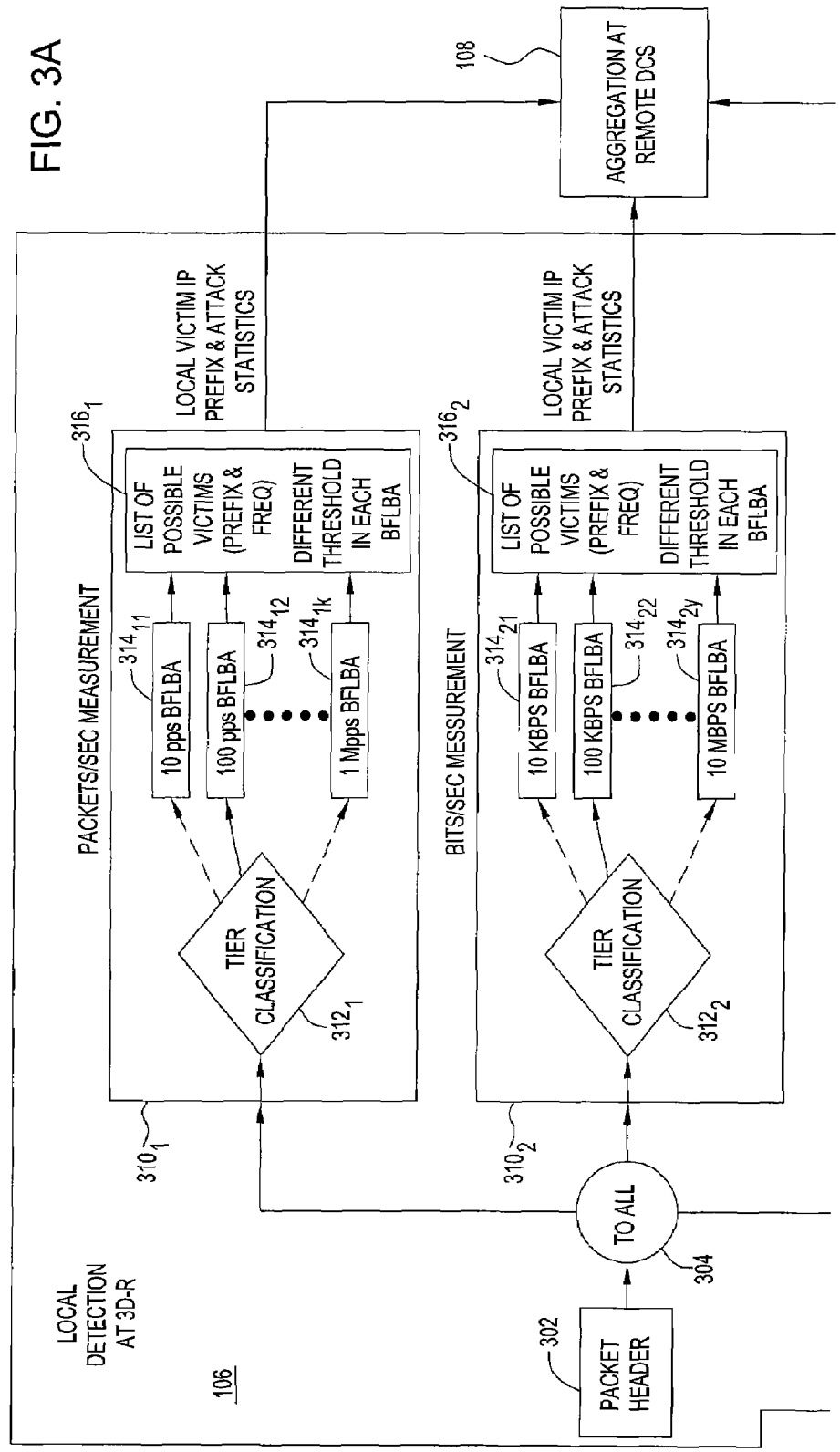
FIGS. 3A and 3B depict a flow diagram of multi-tier Bloom filter/leaky-bucket traffic measurement arrays (BFLBAs) suitable for use in the present invention.
Figure 3B:
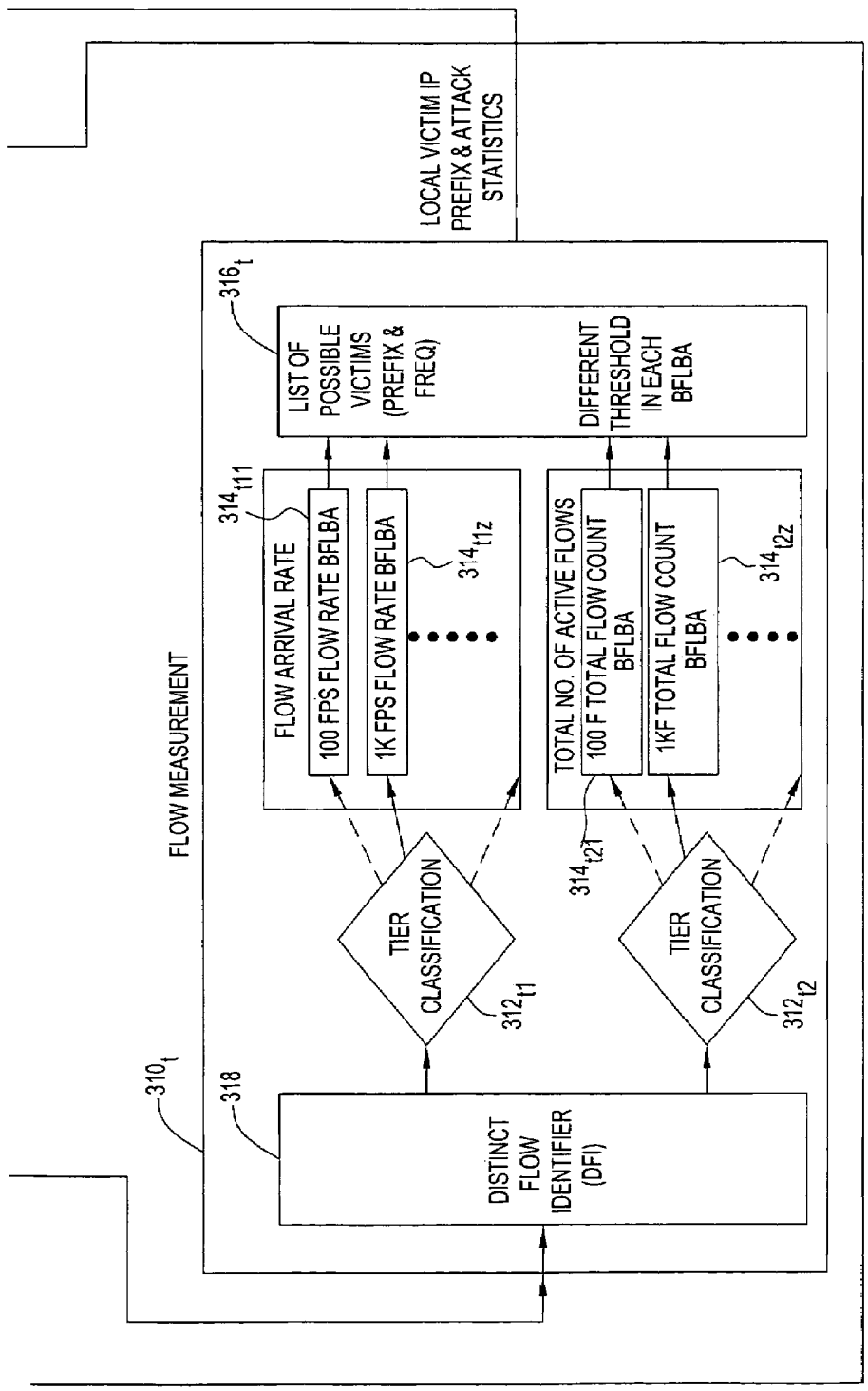

FIGS. 3A and 3B (referred to collectively as "FIG. 3") depict a flow diagram of multi-tier Bloom filter/leaky-bucket traffic measurement arrays (BFLBAs) 314 suitable for use in the present invention. Referring to FIG. 3, each 3D-R 106 examines each packet header 302 of an arriving packet, classifies and measures (counts) particular parameters of the arriving packet 202, and then sends local victim IP prefix and attack statistics to the DCS 108, where the statistics are aggregated, as discussed below in greater detail with respect to FIG. 4.

In particular, the header 302 of an arriving packet is examined by a plurality of measuring parameters $310_1$ through $310_t$ (collectively measuring parameters 310, where t equals an integer greater than 0). In one embodiment, such measuring parameters include measuring packets/second $310_1$, bits/second $310_2$, and flow rate $310_t$. For example, each packet header 302 is contemporaneously routed to the measuring parameters 310, where the packet header 302 is classified (312 of FIG. 3A) for measurement by one of a plurality of BFLBAs 314 associated with each measurement parameter.

For example, a BFLBA 314 may be established for a set of end-points, each has the same range of nominal arrival rates (packets/second (pps)) of packets, such as 10 pps, 100 pps, 1 M pps, and so forth. If the nominal packet arrival rate of the destination of the arriving packet 202 is classified at 10 pps, then the 10 pps BFLBA $314_{11}$ is utilized to measure the number of arriving packets for this destination. Similarly, if the nominal packet arrival rate of the destination of the arriving packet 202 is classified at 1 M pps, then the 1 M pps BFLBA $314_{1k}$ is utilized to measure the number of arriving packets for this destination. Similar processes are performed by the bits/second measuring technique $310_2$ and the flow measurement process $310_t$.

Each BFLBA 314 is used to identify a list of destination networks that receive abnormally high volume of traffic compared to the leaky bucket drain rate associated with that array. Multiple instances of BFLBAs 314, each having a different leaky-bucket drain rate, e.g., 100 kbps, 1 Mbps, 5 Mbps, 10 Mbps, are used to monitor different tiers of end-points according to the nominal rate of traffic they received. The tier classification of each end-point or stub network 110 may be based on the access link capacity of the stub network or via a periodical calibration process. Similarly, a different set of BFLBAs 314 are set up to monitor abnormal jumps in packet arrival rates, i.e., in units of packet/sec, towards the potential victim end-points.

As depicted in FIG. 3B, another set of BFLBAs $314_{t11}$ through $314_{t1z}$ (where z is an integer greater than 1) is augmented with a distinct flow identifier (DFI) 318 to determine whether an arriving packet belongs to a new or existing flow. Here, a flow is defined as a group of packets having the same 5-tuple of {source IP address, destination IP address, source port number, destination port number, and protocol type}. By passing only the first packet of each flow to the subsequent stage of BFLBAs, the DFI 318 in effect converts packet arrivals to flow arrivals. By setting the drain rate of the leaky buckets in the subsequent tiers of BFLBAs according to their nominal flow arrival rates, the destination networks that experience an abnormally high flow arrival rate may be detected. The DFI 318 also feeds its output to another set of BFLBAs $314_{t21}$ through $314_{t2z}$, which are used for detecting possible surges of the total number of active flows carried by each end-point. For these types of BFLBA $314_{t2z}$, the buckets are not drained at a constant nominal rate. Rather, flow arrival counts are accumulated within the corresponding buckets and get counted periodically.

Once the victim destination network is identified, the amount of overflowing traffic destined towards it may be measured and reported to the DCS 108. For a detailed understanding of implementation and operation of Bloom filter/leaky bucket traffic measurement arrays 314, the reader is directed to commonly assigned U.S. patent application Ser. No. 10/232,660, filed Sep. 3, 2002

The BFLBA techniques mentioned above may be generalized to support distributed detection for end-point DDoS attacks. In this case, all 3D-R routers 106 along a security perimeter 114 are equipped with the BFLBAs 314, as described above. During initial calibration, a 3D-R 106 maps each destination network to its corresponding nominal BFL-BAs (i.e., one for nominal received traffic rate in bit/sec, one in packet/sec, one in flow/sec, and one in the total number of distinct active flows). When there is a jump in any one of the four key traffic arrival statistics towards any destination network under protection, the increase will be caught by the corresponding BFLBA(s) in one or more 3D-Rs 106, which will then report the incident to the DCS 108. The report will also include (1) the identity of the potential victim in the form of its destination network prefix and (2) the values of the four key statistics of the suspicious traffic. The DCS 108 then aggregates the reports from all 3D-Rs 106 to decide if there is actually an ongoing attack.

Each 3D-R 106 sends the local victim destination prefix list and attack statistics (e.g., bps, pps, flow counts and flow rates) to the DCS 108, where at step 220, the DCS 108 performs the detection function described above with respect to FIGS. 3A and 3B. Specifically, at 222, the DCS 108 aggregates the attack statistics (received via flow path 211) from all the 3D-Rs 106. Once an attack is detected (i.e., the aggregate scores from the 3D-Rs 106 indicate an on-going attack) and the victim is identified, the DCS 108 sends a message (flow path 225) to all the 3D-Rs 106 confirming the victim destination.

In one embodiment, the DCS 108 performs the aggregation function 222 by comparing the measured attribute values to the nominal attribute values. If the measured attribute values exceed some predetermined threshold that may be equal or greater than the nominal attribute values, then the DCS 108 may conclude that the packets are suspect (i.e., part of an attack). One skilled in the art will appreciate that various thresholds and combinations thereof may be used to determine whether the packets are suspect.

For example, referring to FIG. 1, let the normal traffic flow to stub network $110_n$ include UDP traffic at a rate of 2 Mbps, of which 1 Mbps is sent from the second autonomous system AS2 $112_m$, 0.7 Mbps is sent from the first autonomous system AS1 $1121_1$, and 0.3 Mbps is sent from the first stub network $110_1$. If the 3D-R $106_3$, which is the designated security perimeter router for AS2 $112_m$, detects a spike in UDP traffic (e.g., 1.5 Mbps) destined for the victim 120 in stub network $110_m$ and the predetermined threshold for such UDP traffic is 1.25 Mbps, then the 3D-R $106_3$ sends an alert message to the DCS $108_q$.

If the DCS $108_q$ also receives another alert message from another 3D-R 106 (e.g., 3D-R $106_1$, which supports the stub network1 $110_1$) indicating that it now receives 0.5 Mbps UDP traffic compared to the previous 0.3 Mbps traffic having a predetermined threshold of 0.4 Mbps, the DCS $108_q$ may conclude that there are suspicious activities occurring at the victim's stub network $110_n$.

Alternatively, a large spike in one of the attributes from a single 3D-R 106 may be enough to conclude that an attack may be occurring. For example, a spike to 5 Mbps at AS2 112.sub.m may be deemed sufficient for the DCS 108.sub.q to conclude an ongoing attack and then proceeds to the differentiation functions 230 and 240, as discussed below in further detail. The above example is provided for illustrative purposes only, and one skilled in the art will appreciate that other attributes (e.g., flow rate, among others) may be used instead or in conjunction with each other in a similar manner to detect a possible DDoS. For example, an ongoing attack may be said to have been detected by the DCS 108 in an instance where none of the predetermined thresholds are exceeded individually, but collectively, the overall increase to the victim 120 exceeds some predetermined aggregate threshold.

Referring to FIG. 2, once the DCS 108 determines that an ongoing attack may be in progress, the DCS 108 instructs each 3D-R 106 along the security perimeter 114 to collect local attribute distributions of interest for the traffic destined to the victim 120. At 230, each 3D-R 106 along the security perimeter 114 performs the differentiation function described below with respect to FIG. 4.

In particular, at step 232, each 3D-R 106 collects local packet attribute traffic distributions for all incoming packets. Since the 3D-Rs 106 are upstream, they receive a traffic flow of packets not only being sent to the victim 120, but also receive a traffic flow of packets for routing to other non-victim related destinations. Step 232 is provided to collect local packet attribute information related only to the traffic flow of packets destined for the victim 120.

Each 3D-R 106 receiving the victim destination confirmation 211 uses the statistics for fine-grain traffic profiling of the incoming victim related packets to form a plurality of attribute frequency distributions, such as a plurality of attribute histograms. Such attribute histograms may include IP protocol-type, packet size, source/destination port numbers, source/destination IP prefixes, Time-to-Live (TTL) values, IP/TCP header length, TCP flag combinations, and the like, as well as the arrival rates of suspicious traffic (e.g., bits/sec, packets/sec, and flow measurements), as discussed below with respect to FIG. 4. In one embodiment, each 3D-R 106 then sends its measurement results (attribute frequency distributions) in the form of iceberg-style histograms to the DCS 108 for aggregation.

It is noted that the attack statistics (i.e., bps, pps, flow counts and rates) sent to the DCS 108 at step 232 may be different than those sent to the DCS at step 210, since they occur at different times. In other words, at step 210, the attack statistics were merely used to detect an attack. The attack statistics are used to as a weighing factor to combine the local and joint distribution of packets. Accordingly, the attack statistics measured at step 210 may be considered as being untimely, and therefore, at step 232, updated statistics are provided to the DCS 108 illustratively in the form of iceberg-style histograms.

It is further noted that the iceberg-style histograms are used because they provide information for entries exceeding a predetermined threshold. Accordingly, using iceberg-style histograms helps conserve memory and bandwidth, since less relevant information is dropped. However, the use of iceberg-style histograms should not be considered as limiting, and one skilled in the art will appreciate that other frequency distribution techniques also may be utilized to exhibit packet attribute information.

Figure 4A:
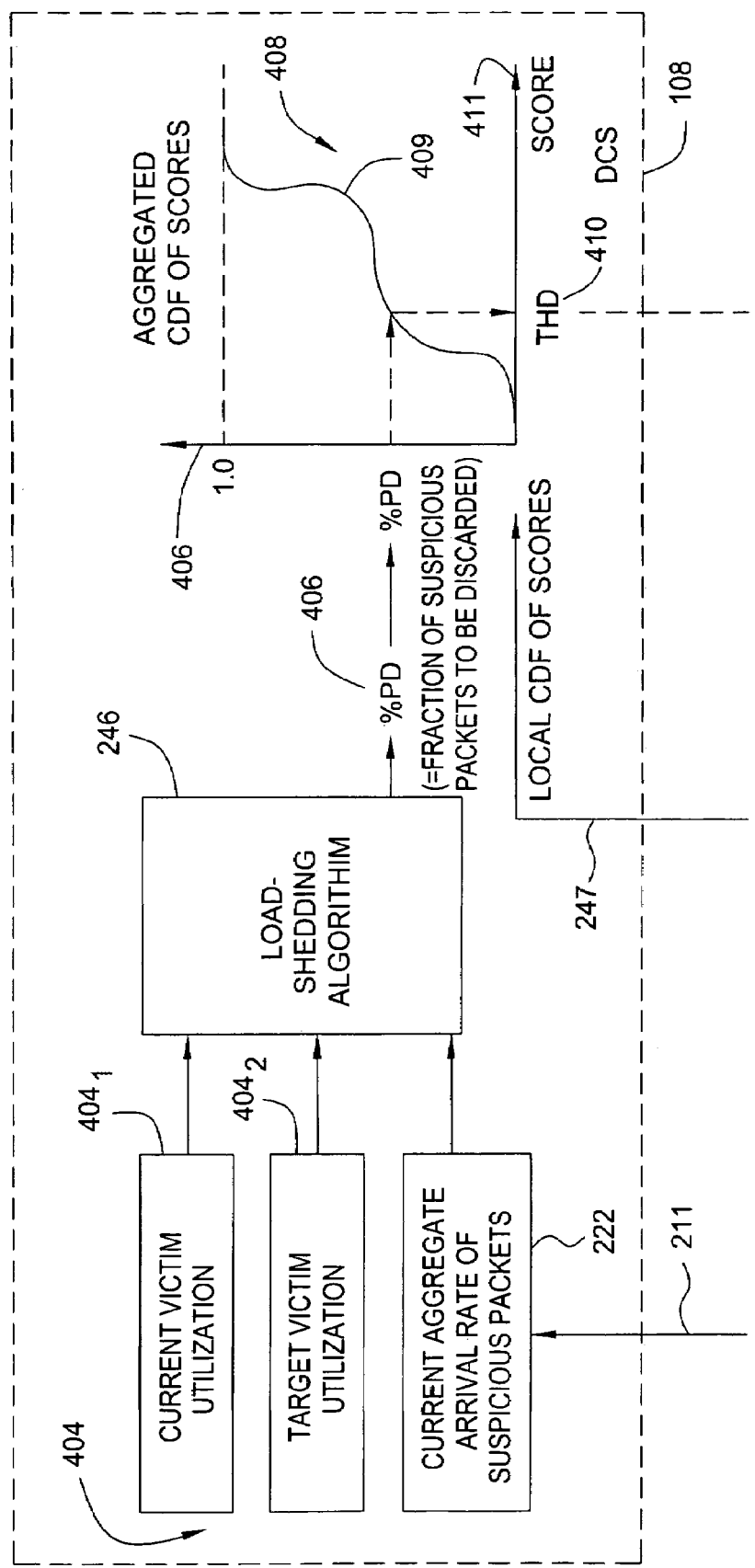
FIGS. 4A and 4B depict a flow diagram illustrating packet differentiation and overload control of the present invention.
Figure 4B:
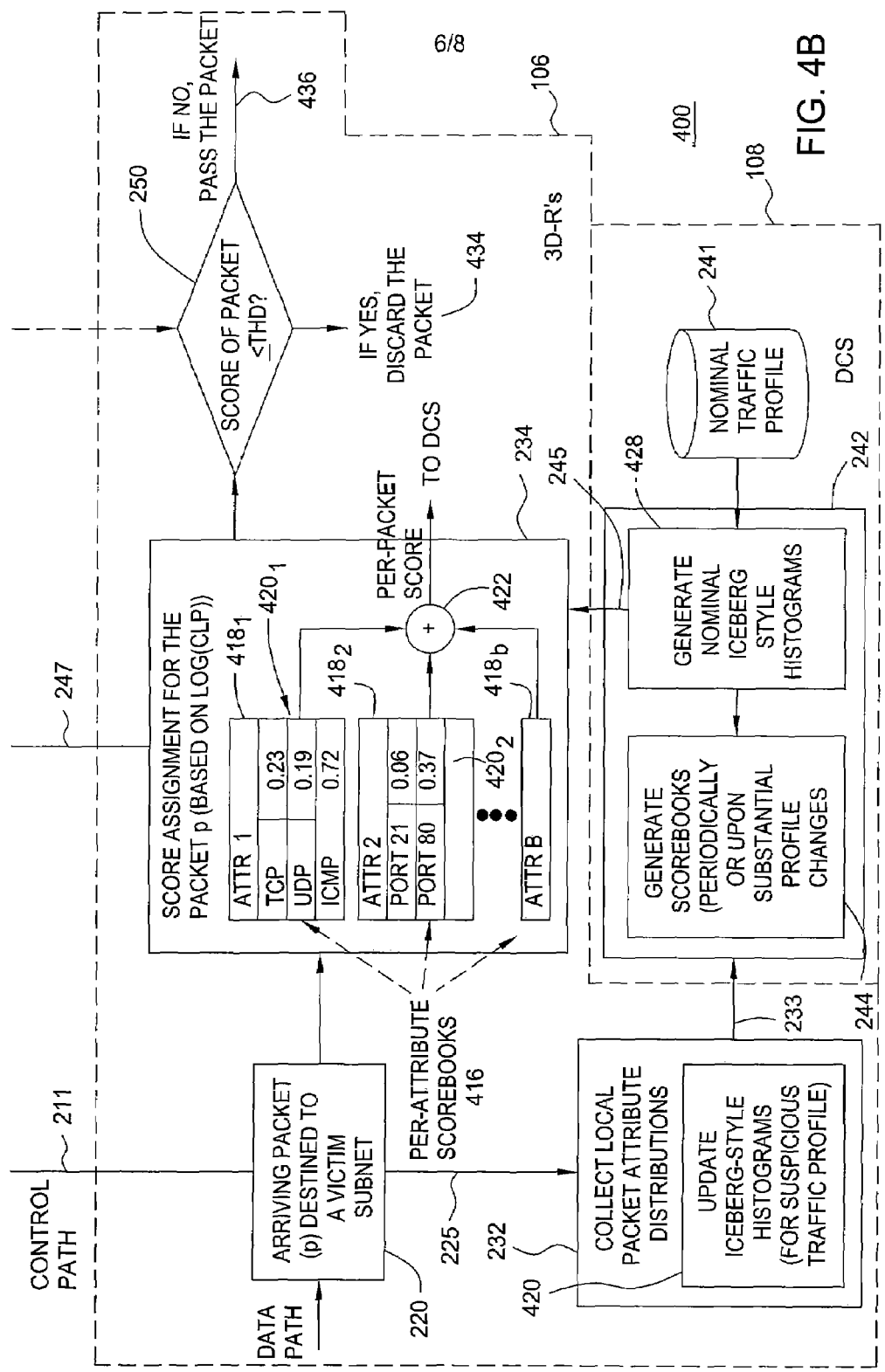

FIGS. 4A and 4B (referred to collectively as "FIG. 4") depict a flow diagram illustrating packet differentiation and overload control of the present invention. That is, FIG. 4 illustrates the operations between CLP computation at the 3D-Rs 106 and the determination of dynamic discarding threshold for CLP at the DCS 108.

In particular, at 220, packets arriving at the 3D-Rs 106 are examined using the BFLBA techniques described above and the attribute information is sent as and input 404, via control path 211, to the DCS 108. The current aggregate arrival rate of suspicious packets 222, as well as current victim utilization $404_1$ and target victim utilization $404_2$ are provided to a load-shedding algorithm to compute a fraction of suspicious packets to be discarded, as discussed below in further detail with respect step 246 of FIG. 2.

As discussed above with respect to step 220, detection of the victim is performed by examining, in the aggregate, increases in attribute counts and rates. At step 224, the victim is confirmed and confirmation is sent to each 3D-R via paths 225. That is, the DCS 108 notifies each of the 3D-Rs 106 that a particular network (e.g., stub network $110_n$) is being attacked. At step 232, each 3D-R 106 collects local packet attribute distributions. While sophisticated traffic analysis and profiling may be conducted offline using various well-known data-mining and machine learning techniques, there are great incentives to perform such analysis online, albeit on a less detailed manner, to reduce reaction time and eliminate the need of storing long traffic traces. In one embodiment fine-grain traffic analysis and comparison techniques are implemented, which is amenable to high speed hardware-based implementation. Specifically, hardware-based online monitoring is provided for a set of fine-grain statistics of the suspicious traffic, and then compared to their nominal reference values in real-time.

A disproportional increase in the relative frequency of a particular packet attribute value is an indication that the attacking packets also share the same value for that particular attribute. The greater the disproportional increase, the stronger the indication. The more "abnormal" attribute values a packet possesses, the higher the probability that the packet is an attacking packet. For example, if it is found via online processing that the suspicious packets contain abnormally high percentage of (1) UDP packets and (2) packets of size S and (3) packets with TTL value T, then UDP packets of size S and TTL value T destined to the DDoS victim 120 may be treated as prime suspects and given lower priority upon selective packet discarding during overload.

Candidate traffic statistics used for fine-grain traffic profiling include marginal distributions of a fraction of "recently arrived" packets having various (1) IP protocol-type values, e.g., TCP, UDP, IGMP, ICMP etc, (2) packet size, (3) source/destination port numbers, (4) source/destination IP prefixes, (5) Time-to-Live (TTL) values, (6) IP/TCP header length (which may be used to detect possible abuse of IP/TCP options), (7) TCP flag combinations, e.g., SYN, RST, ACK, SYN-ACK, and the like. Profiling against relative frequency of different attribute values (instead of absolute packet arrival rates) helps to alleviate the difficulties caused by the expected fluctuation of nominal traffic arrival rates due to time-of-the-day and day-of-the-week behavior Other candidate statistics that may be used include the fraction of packets that (8) use IP fragmentation, and/or (9) incorrect IP/TCP/UDP checksums. Also worthwhile to consider is the joint distribution of the fraction of packets having various combinations of (10) TTL value and source IP prefix, (11) packet-size and protocol-type as well as (12) destination port number and protocol-type.

At 420, each of the 3D-Rs 106 generates iceberg-style histograms, which represent the packet attributes for the suspicious traffic. Once the histograms are updated, the 3D-Rs 106 send the local marginal/joint distribution of packet attributes (i.e., histograms), as well as the arrival rates of suspicious traffic to the DCS 108 via path 233.

At step 242, the DCS 108 aggregates the measured results from all of the 3D-Rs 106 sending such suspicious traffic histograms. In one embodiment, each attribute is aggregated using a weighted average.

For example, assume that the protocol type of incoming packets at a first 3D-R has a distribution of 50% TCP, 10% UDP, and 40% ICMP, while a second 3D-R has a distribution of 60% TCP, 20% UDP, and 20% ICMP. Further, the arrival rate at the first 3D-R is 100 pps, while the arrival rate at the second 3D-R is 150 pps. The aggregate values for the distribution of protocol types may be computed by using a weighting factor, such as the arrival rate in packets-per-second (pps), bits-per-second (bps) among others. Table 1 depicts the weighted contributions to the aggregate value for the exemplary protocol type attribute.

TABLE 1

| 3D-R1 | | 3D-R2 | | |
|---|---|---|---|---|
| Protocol | Weighed Avg. | Protocol | Weighed Avg. | Totals |
| TCP | (100)(50%) | TCP | (50)(60%) | 50 + 30 = 80 |
| UDP | (100)(10%) | UDP | (50)(20%) | 10 + 10 = 20 |
| ICMP | (100)(40%) | ICMP | (50)(20%) | 40 + 10 = 50 |
| Totals | | | | 80 + 20 + 50 = 150 |

Thus, the aggregate percentages of TCP, UDP, and ICMP packets are respectively 80/150=53.4%, 20/150=13.3%, and 50/15=33.33%. It is noted that one skilled in the art will appreciate that other aggregating techniques may be implemented to generate an aggregate profile of the suspicious traffic. The aggregated attributes from each histogram associated with each 3D-R 106 are subsequently used, at 244, to generate scorebooks at the DCS 108.

At 241, the DCS 108 also retrieves the nominal fine-grain traffic profile of the victim 120 from its database. It may be expected that a nominal traffic profile of each target includes a set of marginal and joint distributions of various packet attributes. This profiling information is stored in the form of normalized histograms of one or higher dimensions.

At 428 of FIG. 4, the nominal iceberg-style histograms are generated from the nominal traffic attribute information stored in the database. The nominal iceberg-style histograms provide a baseline for comparison to the measured iceberg-style histograms, as discussed below in further detail with respect to generating scorebooks at step 244. Due to the number of attributes to be incorporated in profile (in the order of ten or more) and the large number of possible values of each attribute (as much as tens of thousands or more, e.g., in the case of possible source IP prefixes), an efficient data structure is required to implement such histograms. This is particularly important for the case of distributed overload control because traffic profiles have to be exchanged between the 3D-Rs 106 and the DCS 108.

As discussed above with respect to the measured attribute histograms sent from the 3D-Rs 106, "iceberg-style" histograms are also utilized for the nominal traffic profile of the attributes. That is, the histogram only includes those entries in the population that appear more frequently than a preset percentage threshold, e.g., x%. This guarantees that there are no more than 100/x entries in the histogram. For entries which are absent from the iceberg-style histogram, the upper bound, i.e., x%, as their relative frequency is used. Due to the vast dimensions of joint distribution functions, an iceberg-style implementation is particularly important.

By using iceberg-style histograms, a fine-grain per-target profile may be kept to a manageable size. For instance, consider a profile consisting of 20 different marginal or joint distributions. With an exemplary iceberg threshold set at 1%, the entire profile will contain a maximum of 20*100/1=2,000 entries. Using 4-byte representations for the attribute and relative frequency values within each entry, each profile will require a maximum of (8*2,000) approximately 16 Kbytes of storage.

At step 244, the DCS 108 generates scorebooks, which compares the nominal fine-grain traffic profile with the aggregated profile of the suspicious traffic from all of the 3D-Rs 106 to generate the attribute scorebooks. Specifically, each of the upstream 3D-Rs 106 uses the scorebooks for scoring subsequent incoming packets. The scorebooks are used instead of histograms to reduce the amount of information being sent (i.e., to conserve bandwidth) across the network and also to speed-up the computation of score for each suspicious packet at the upstream 3D-Rs 106.

The DCS 108 generates a scorebook for each attribute, where each attribute has an entry for each possibility. Referring to FIG. 4, two exemplary attribute scorebooks of a plurality of attribute scorebooks 416 are shown. In particular, a first exemplary attribute $418_1$ for protocol type comprises a listing of the protocol types received from the current and nominal histograms (e.g., TCP, UDP, ICMP, among others), and a "score" (i.e., value) $420_1$ associated with each listed protocol type. Similarly, a second exemplary attribute $418_2$ (e.g., destination port) comprises a listing of the destination ports received from the current and nominal histograms (e.g., e.g., port 21, port 60, among others), and a "score" (i.e., value) $420_2$ associated with each listed destination port. Details of computing the value of each score is discussed in further detail below.

The present invention utilizes a methodology to prioritize packets based on a conditional probability that given the values of attributes carried by packet, the packet is a legitimate one. Such methodology is termed the "conditional legitimate probability" (CLP) of a packet hereinafter. The CLP of a suspicious packet measures the likelihood of the packet being a legitimate (instead of an attacking) one, given the attribute values it possesses.

The conditional probability of each packet is evaluated based on Bayesian estimation techniques. This is accomplished by comparing the attributes carried by an incoming packet against the "nominal" distribution of attributes of legitimate packet stream. Since an exact prioritization of packets based on their conditional legitimate probability would require offline, multiple-pass operations (e.g. sorting), an alternative approach is taken to realize an online, one-pass selectively dropping technique.

In particular, the cumulative distribution function (CDF) of the conditional legitimate probability (CLP) for all incoming packets is maintained, and a threshold-based selective dropping mechanism is applied according to the conditional probability value computed for each incoming packet. To speed-up the computation of the CLP for each incoming packet, as an alternative, the logarithmic version of the equation may be used to implement the Bayesian estimation process.

Initially, the invariant nature of these candidate distributions are assessed by performing statistical analysis on existing traffic traces. Based on such findings, a final set of distributions are selected to be incorporated in the nominal fine-grain traffic profile. For example, consider all the packets destined towards a DDoS attack target. Each packet carries a set of discrete-valued attributes A, B, C, and so forth. Attribute A may illustratively be the protocol-type, attribute B may illustratively be the packet-size, and attribute C may illustratively be the TTL values, and so forth.

Let $JP_n(A,B,C, \ldots)$ be the joint probability mass function of attribute values under normal operations, i.e., while there is no attack, which is determined at step 241. The probability of a normal packet having values a, b, c, . . . for attributes A, B, C, . . . respectively, is given by $JP_n(A=a,B=b,C=c, \ldots)$. Similarly, $JP_m(A, B, C, \ldots)$ is used to denote the joint probability mass function of packet attributes measured during an attack, which is determined at step 242. The conditional legitimate probability of packet p is defined as:

$CLP(p)=Prob(p$ is a legitmate packet|Attributes $A, B, C, \ldots$ of packet p are equal to $a_p, b_p, c_p,$ respectively)

Using the standard Bayesian argument, it may be shown that:

$$CLP(p) = \frac{\rho_n}{\rho_m} \cdot \frac{JP_n(A=a_p, B=b_p, C=c_p, \cdots)}{JP_m(A=a_p, B=b_p, C=c_p, \cdots)}, \quad \text{Eq. (1)}$$

where $\rho_n$ ($\rho_m$) is the nominal (currently measured) utilization of the system, respectively. Observe that, since $\rho_n/\rho_m$ is constant for all packets within the same observation period, one may ignore its contribution when comparing and prioritizing packets based on their CLP values, as long as the packets arrive within the same observation period. By assuming the attributes to be independent of each other, Eq.(1) may be rewritten as, $$CLP(p) = \frac{\rho_n}{\rho_m} \cdot \frac{P_n(A=a_p)}{P_m(A=a_p)} \cdot \frac{P_n(B=b_p)}{P_m(B=b_p)} \cdot \frac{P_n(C=c_p)}{P_m(C=c_p)} \cdots, \quad \text{Eq. (2)}$$

where $P_n(X)$ and ($P_m(X)$) is the respective marginal probability mass functions of packet attribute X under nominal and currently measured traffic conditions. Similarly, by assuming different dependency amongst various attributes, conditional legitimate probability (CLP) may be expressed in the form of a combination of marginal and joint probability mass function values.

In the above formulation, it is assumed that the nominal profiles (i.e., $JP_n(A, B, C, \ldots)$ and $P_n(X)$'s) of step 241 are constant for ease of illustration. In general, the nominal traffic profile is a function of time, which exhibits periodical time-of-the-day, e.g., diurnal, day-of-the-week variations as well as long term trend changes. While long-term profile changes may be handled via periodical re-calibration using standard time-series forecast and extrapolation techniques, the daily or weekly variation between successive re-calibration may require time-of-the-day, day-of-the-week specific traffic profiles.

In one embodiment, storage and maintenance requirement of a large set of time-specific nominal profiles may be reduced by using a high percentile, e.g., 95-percentile, of the nominal distribution as the corresponding reference values. An alternative approach is to formulate and quantify the statistical significance of the deviation of the current traffic profile with respect to the nominal one, while taking into account the inherent statistical fluctuation of both profiles. The aim is to minimize detection error due to noisy process of profile estimation.

According to Equations (1) and (2) discussed above, the real-time per-packet processing of a naive implementation of the conditional legitimate probability (CLP) computation seems formidable, since the current packet attribute distributions have to be updated as a result of the arriving packet. The CLP for the incoming packet may be computed only after the packet attribute distributions have been updated. To make wire-speed per-packet CLP computation possible, the update of packet attribute distribution is decoupled from that of CLP computation, to allow CLP computation and packet attribute distribution to be conducted in parallel, but at different time-scales. With such decoupling, the CLP computation is based on a snapshot of "recently" measured histograms, while every packet arrival (unless additional sampling is employed) will incur changes to the current packet attribute histograms.

In particular, a frozen set of recent histograms is used to generate a set of "scorebooks," which maps a specific combination of attribute values to its corresponding "score." The scorebooks are updated periodically in a time-scale longer than the per-packet arrival time-scale, or upon detection of significant change of the measured traffic profile. By assuming attribute independence and using the logarithmic version of Eq. (2) as shown below in Eq. (3), a scorebook may be constructed for each attribute that maps different values of the attribute to a specific partial score.

$$\log[CLP(p)] = \begin{Bmatrix} [\log(\rho_n) - \log(\rho_m)] + \\ [\log(P_n(A = a_p)) - \log(P_m(A = a_p))] + \\ [\log(P_n(B = b_p)) - \log(P_m(B = b_p))] + \\ [\log(P_n(C = c_p)) - \log(P_m(B = b_p))] + \ldots \end{Bmatrix} \quad \text{Eq. (3)}$$

For instance, the partial score of a packet with attribute A equal to $a_p$ is given by $[\log(P_n(A=a_p)) - \log(P_m(A=a_p))]$. According to Eq.3, the partial scores of different attributes may be summed to yield the logarithm of the overall CLP of the packet. This scorebook approach enables hardware-based computation of per-packet CLP by replacing numerous floating-point multiplications and divisions in Eq. (2) with simple additions and table lookups. This scorebook approach may be readily extended to handle nominal profiles which contain of a mixture of marginal and joint packet attribute distributions. Of course, the scorebook for a multiple-attribute joint-distribution will be larger. The size of the scorebook may be further reduced by adjusting (1) the iceberg threshold and (2) quantization steps of the score.

As noted above, the generated scorebooks are temporarily "frozen" in time (i.e., snapshots) to avoid a race condition between scoring the packets and updating with new information sent to the DCS 108, which would otherwise lead to an undesirable result of constantly trying to generate a new scorebook with ever changing information. For example, if an attribute in either the numerator or denominator of Equation (1) changes, the histogram change is sent back to the DCS 108, which would then try to generate another scorebook to be sent to all of the 3R-Ds 106, such that a continuous loop therebetween may exist. To decouple the updating of histograms and concurrent generation of scorebooks, (i.e., the race condition) the scorebooks are frozen, and only updated by a periodic or substantial change in an attribute.

Once the scorebooks are generated for each attribute, the scorebooks are sent to each of the 3D-Rs 106, such that each 3D-R may use the scorebooks to score subsequent incoming packets. It is noted that each of the 3D-Rs 106 receives the same set of scorebooks, as shown by path 245 of FIG. 2.

Figure 5A:
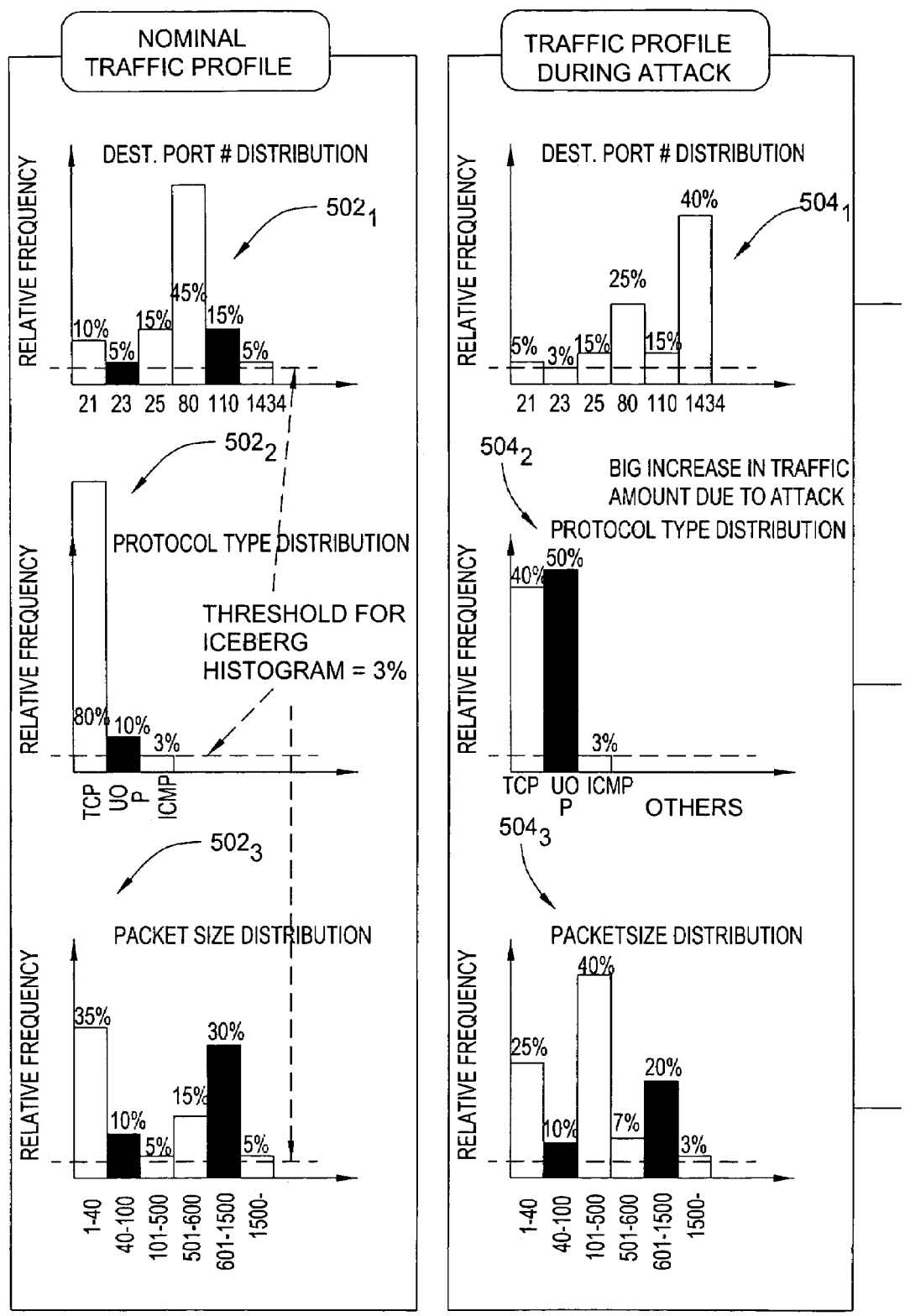
FIGS. 5A and 5B depict an illustrative flow diagram for defending against a distributed denial-of-service attack (DDoS).
Figure 5B:
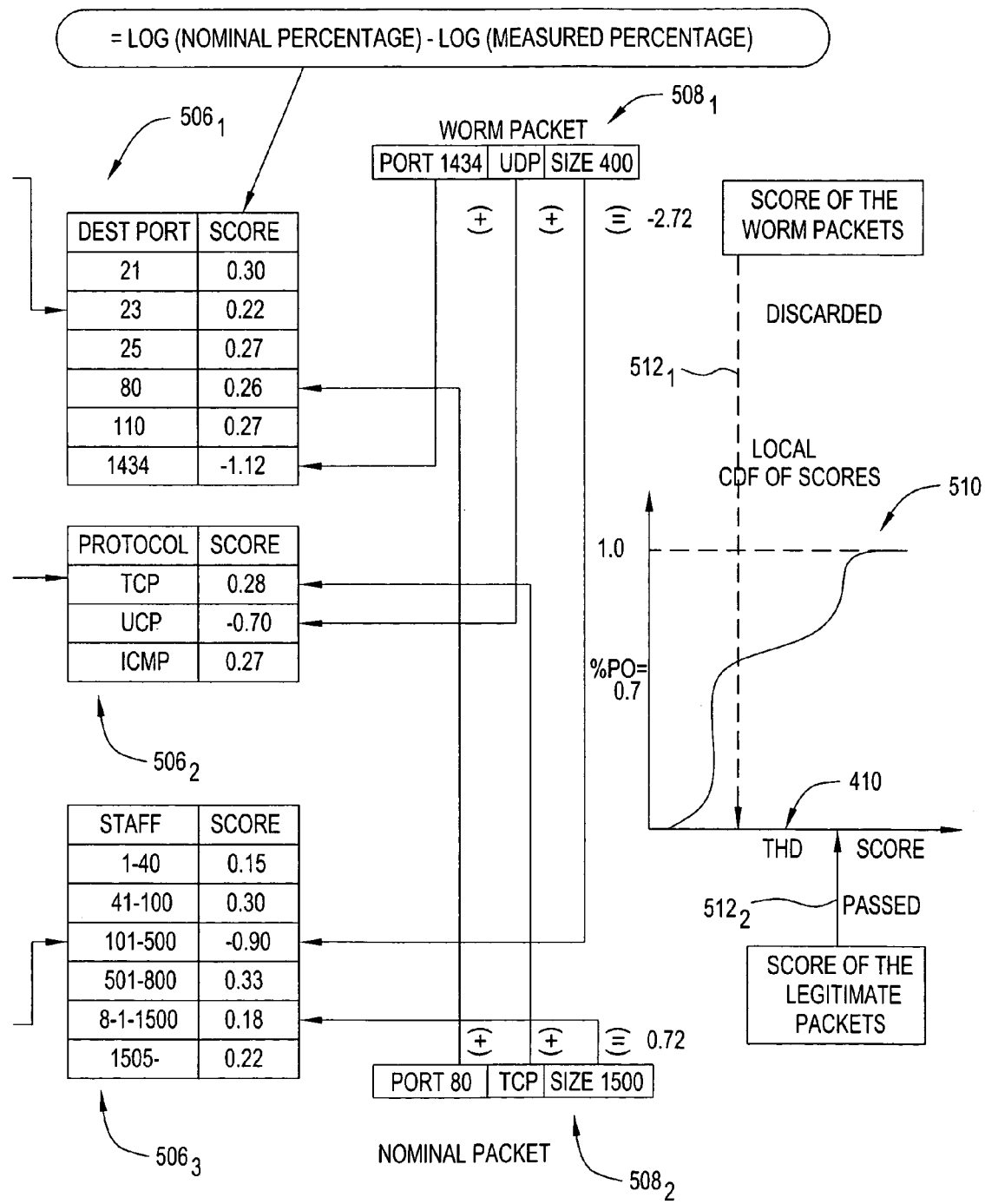

FIGS. 5A and 5B (referred collectively as "FIG. 5") depict an illustrative flow diagram 500 for defending against a distributed denial-of-service attack (DDoS). Specifically, FIG. 5 shows selective discarding of the packets generated by a SQL Slammer attack (also known as the Sapphire Worm). The attack is illustratively comprised of UDP packets with destination port number 1434, and of packet size ranging from 371 to 400 bytes. For purposes of understanding the invention, a nominal profile includes the iceberg-style histograms 502, shown therein. For example, a first nominal iceberg-style histogram 502$_1$ is provided for the destination port number distribution attribute, a second nominal iceberg-style histogram 502$_2$ is provided for the protocol type distribution attribute, and a third nominal iceberg-style histogram 502$_3$ is provided for the packet size distribution attribute.

FIG. 5 also depicts the corresponding iceberg-style histogram 504 of the traffic profile during the attack for the same attributes. For example, a first attack iceberg-style histogram 504$_1$ is provided for the destination port number distribution attribute, a second attack iceberg-style histogram 504$_2$ is provided for the protocol type distribution attribute, and a third attack iceberg-style histogram 504$_3$ is provided for the packet size distribution attribute.

During the attack, there is a surge of UDP packets with destination port number 1434. As the fraction of packets having destination port number 1434 exceeds the preset iceberg threshold (say 3% in this example), port 1434 is recorded in the measured profile during the attack. On the other hand, the same port number does not show up in the nominal destination port iceberg-style histogram because 1434 is not a frequently appearing port number.

As discussed above, in a scorebook 506$_1$ for the destination port number attribute, the partial score for destination port number 1434 is given by $[\log(0.03) - \log(0.4)] = -1.12$, where the iceberg threshold, 3%, i.e., 0.03, is used as a conservative estimate of the relative frequency of destination port number 1434 under nominal conditions. Following the same procedure, partial scores of a worm packet due to the protocol-type and packet-size attributes are illustratively computed by $[\log(0.1) - \log(0.5)] = -0.70$, and $[\log(0.05) - \log(0.4)] = -0.90$, as respectively shown in scorebooks 506$_2$ and 506$_3$.

Assuming that there is no change in the distributions of all other attributes in the profile, at 508$_1$, the score of a worm packet, i.e., the logarithm of its CLP value, is computed as $-(1.12+0.7+0.9) = -2.72$. By comparison, at 508$_2$, the score of a legitimate 1500-byte TCP packet carrying HTTP traffic destined to port 80 is given by $\{[\log(0.45) - \log(0.25)] + [\log(0.85) - \log(0.45)] + [\log(0.3) - \log(0.2)]\} = (0.26 + 0.28 + 0.18) = +0.72$. As a result, such legitimate packets have a much higher score than the worm packets. As the fraction of worm (normal) packets contained in the suspicious traffic increases (decreases), the score of such packets will decrease (increase) further. In other words, the score difference between attacking and legitimate packets increases as the attack intensifies.

Thus, at step 234, each subsequent incoming packet at each 3D-R 106 has an overall packet score computed. That is, each 3D-R uses the attribute scorebooks sent to it at step 244 to look up the attributes associated with the packet and correlate the value associated with that particular attribute.

Furthermore, at step 234, score is then used to define generate a cumulative distribution function (CDF) of the conditional legitimate probability (CLP) for all incoming suspicious packets associated with each 3D-R 106. The CDF of the conditional legitimate probability (CLP) for all incoming suspicious packets is maintained using one-pass quantile computation techniques, as conventionally known in the art. In particular, a score is computed for a predetermined number (set) of incoming packets at each 3D-R, and such scores are used to derive a local CDF, as shown by chart 510 in FIG. 5. In one embodiment, the predetermined set (sample) of incoming packets used to generate the local CDF may be in a range of 100 to 100000 packets, depending on the desired accuracy of the function.

Referring to FIG. 5, assume that based on the current offered load of the victim, and its target utilization, the load-shedding algorithm 402 sets the value of the packet-discarding percentage $\%_{PD}$ at 0.70. That is, 70% of the suspicious packets towards the victim have to be discarded in order to keep the load of the victim at an acceptable utilization. At 510, the corresponding discarding threshold, Thd, is looked up from the snapshot CDF 408 of the log (CLP) values. Since the score $512_1$ of the worm packets is less than Thd 410, all the worm packets are discarded. The legitimate 1500-byte TCP packets carrying HTTP traffic, however, are allowed to pass through as their score $512_2$ is greater than Thd 410. Referring to FIG. 2, at step 234, each of the 3D-Rs 106 then sends the local CDF of scores back to the DCS 108 for aggregation, as shown by path 247.

At step 248, the DCS 108 aggregates the local CDF of scores received from each of the 3D-Rs 106. Aggregation of the local CDF of scores may be performed by weighting the contribution of each 3D-R 106 according to the suspicious packet arrival rate it observed. In particular, since the entire information carried by each local CDF can be equivalently expressed in form of a histogram, the weighted aggregation techniques described in Table 1 can be applied for aggregating local CDFs of scores, among other conventionally known aggregation methods.

Referring to FIG. 4, a recent snapshot 408 of the cumulative distribution function (CDF) of the conditional legitimate probability (CLP) values of all suspicious packets is illustratively shown. The snapshot 408 comprises an ordinate representing the packet-discarding percentage $(\%_{PD})$ 406 and an abscissa 411 representing the packet score. Furthermore, exemplary curve 409 represents the aggregate CDF of the CLP values of all suspicious packets within the predetermined number (set) of incoming packets at each 3D-Rs 106.

Once the aggregated CLP is computed for each suspicious packet via fine-grain real-time traffic profiling, selective packet discarding and overload control may be conducted by using CLP as the differentiating metric. One key idea is to prioritize packets based on their CLP values. Since an exact prioritization would require offline, multiple-pass operations (e.g., sorting), an alternative approach is to realize an online, one-pass operation.

In particular, the aggregate CDF of scores is then utilized to determine the conditional legitimate probability (CLP) discarding threshold (Thd) for packet discarding purposes. At step 246, the load-shedding algorithm is utilized to determine the fraction $(\%_{PD})$ of arriving suspicious packets required to be discarded, in order to control the utilization of the victim 120 to be below a target value. Further, the discarding threshold Thd is computed by the DCS 108 based on the required $\%_{PD}$ and aggregate CDF of scores, and sent to each of the 3D-Rs 106 as shown by path 249 of FIG. 2. That is, the discarding threshold is calculated using the load shedding algorithm, combined with an inverse lookup on the aggregate CDF of scores. The inverse lookup is needed to convert the % of packets to be discarded, which is the output of a load shedding algorithm, to the corresponding cut-off score to be used for selective packet discarding. The same CLP discarding threshold (Thd) is then sent to every 3D-R 106 via path 249, such that each 3D-R 106 may discard some or all of the attacking packets.

FIG. 4 depicts a flow diagram illustrating packet differentiation and overload control of the present invention. The DCS 108 includes a load-shedding algorithm 402 that is used to determine the fraction $(\%_{PD})$ 406 of arriving suspicious packets required to be discarded in order to control the utilization of the victim 120 to be below a target value. At least one input $404_c$ (where c is and integer greater than zero) is provided to the load-shedding algorithm 402, such as current utilization of the victim $404_1$, maximum (target) utilization allowed for the victim $404_2$, as well as the current aggregated arrival rate of suspicious traffic $404_c$. Once the required packet-discarding percentage $(\%_{PD})$ 406 is determined, a corresponding CLP discarding threshold (Thd) 410 is looked up from a recent snapshot 408 of the cumulative distribution function (CDF) of the conditional legitimate probability (CLP) values of all suspicious packets.

It is noted that the use of a snapshot version 408 of the CDF (instead of the most up-to-date one) eliminates possible race-conditions between discarding threshold updates and CDF changes upon new packet arrivals. The snapshot 408 is updated periodically or upon significant changes of the packet score distribution. The adjustment of the CLP discarding threshold Thd 410, as well as the load-shedding algorithm 402, are expected to operate at a time-scale that is considerably longer than the packet arrival time-scale.

At step 248, the DCS 108 then sends the discarding threshold value to all of the 3D-Rs 106, as shown by path 249 in FIG. 2. That is, each 3D-R uses the same discarding threshold value to determine whether an incoming packet is to be passed through or discarded.

In particular, at step 250, each 3D-R 106 determines whether the score of the incoming suspect packet is less than or equal to the CLP discarding threshold (Thd). If the determination is answered affirmatively, then the suspect packet is discarded, otherwise the packet is passed through for further routing.

Referring to FIG. 4, At 250, a query is made whether the score of the packet is less than or equal to the discarding threshold Thd 410. If the query is answered affirmatively, then at 434, the incoming packet 202 is then discarded. Otherwise, if the query is answered negatively, then at 436, the incoming packet 202 is passed on for routing to its destination.

For example, referring to FIG. 5, assume that based on the current offered load of the victim, and its target utilization, the load-shedding algorithm 402 sets the value of the packet-discarding percentage $\%_{PD}$ at 0.70. That is, 70% of the suspicious packets towards the victim have to be discarded in order to keep the load of the victim at an acceptable utilization. At 510, the corresponding discarding threshold, Thd, is looked up from the snapshot CDF 408 of the log (CLP) values. Since the score $512_1$ of the worm packets is less than Thd 410, all the worm packets are discarded. The legitimate 1500-byte TCP packets carrying HTTP traffic, however, are allowed to pass through, as their score $512_2$ is greater than Thd 410.

It is also important to re-emphasize that, while CLP-computation is always performed for each incoming packet, selective packet discarding only happens when the system is operating beyond its safe (target) utilization level $\rho_{target}$. Otherwise, the overload control scheme sets the packet-discarding percentage $(\%_{PD})$ to zero.

The present invention has been described in terms of three phases, which include fine-grain traffic profiling, packet differentiation, and selective packet discarding under a stand-alone operation setting. These three phases of operation are distributed by implementing a DDoS control server (DCS) 108 to aggregate local information from each of the 3D-Rs 106.

It is noted that the above information exchange between a 3D-R 106 and a DCS 108 may be conducted either in a periodical manner or upon significant changes in traffic conditions. Specifically, the aggregate CDF of scores and the histograms (i.e., nominal and current histograms) may be updated periodically or upon significant changes in traffic conditions. Such updates of the CDF of scores and histograms may be performed independently, since no update is required unless there have been significant changes in the corresponding CDF of scores or the histogram. Thus, a distributed architecture using a set of collaborating 3D-Rs and DCSs has been shown and described to defend against DDoS attacks. The proposed architecture uses novel hardware implementation of advanced data-stream processing techniques, including one-pass operations of iceberg-style histograms and quantile (CDF) computations, to enable scalable, high-speed fine-grain traffic profiling and per-packet scoring. By leveraging such real-time profiling and wire-speed packet scoring capabilities, we will realize adaptive differentiation between attacking and legitimate packets to enable selective discarding and overload control at 10 Gbps and higher.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof.

What is claimed is:

1. A method for determining packets to be discarded in response to a distributed denial-of-service (DDoS) attack, said method comprising:

confirming a DDoS attack at a network location using a plurality of packet attribute values aggregated from a plurality of routers forming a security perimeter of a network;

computing an aggregate conditional probability measure for each packet entering said location based on selected attributes included within said packet from each of said plurality of security perimeter routers;

computing an aggregate cumulative distribution function (CDF) of scores based on said computed aggregate conditional probability measures;

determining a discarding threshold using said cumulative probability function; and sending said discarding threshold to each of said plurality of security perimeter routers.

2. The method of claim 1, wherein said step of computing an aggregate conditional probability measure further comprises:

updating an individual marginal probability mass function and a joint probability mass function for attributes carried by each said packet.

3. The method of claim 1, further comprising:

granting immunity to packets of a specified sub-type entering said location.

4. The method of claim 1, wherein said aggregate conditional probability measure is computed in accordance with the following equation:

$$CP(p) = \frac{\rho_n}{\rho_m} \cdot \frac{JP_n(A=a_p, B=b_p, C=c_p, \ldots)}{JP_m(A=a_p, B=b_p, C=c_p, \ldots)}$$

where: $\rho_m$ is currently measured utilization of a system;
$\rho_n$ is nominal utilization of the system;
A, B, C, ... is a set of packet attributes;
$JP_n(A, B, C, \ldots)$ is a joint probability mass function of the set of attributes under normal traffic conditions;
$JP_m(A, B, C, \ldots)$ is the joint probability mass function of the set of attributes measured under current traffic conditions; and
a, b, c, ... are the particular values that the attributes A, B, C, ... take.

5. The method of claim 1, wherein said aggregate conditional probability measure is computed in accordance with the following equation:

$$CP(p) = \frac{\rho_n}{\rho_m} \cdot \frac{P_n(A=a_p)}{P_m(A=a_p)} \cdot \frac{P_n(B=b_p)}{P_m(B=b_p)} \cdot \frac{P_n(C=c_p)}{P_m(C=c_p)}$$

where: $\rho_m$ is currently measured utilization of a system;
$\rho_n$ is nominal utilization of the system;
A, B, and C is a set of packet attributes;
$P_n(A, B, C)$ is a marginal probability mass function of the set of attributes under normal traffic conditions;
$P_m(A, B, C)$ is the marginal probability mass function of the set of attributes measured under current traffic conditions; and
a, b, and c, are the particular values that the attributes A, B, and C take.

6. The method of claim 1, wherein said discarding threshold is calculated using a load shedding algorithm, combined with an inverse lookup on the aggregate CDF of scores.

7. The method of claim 2, wherein said joint and marginal probability functions are maintained using iceberg-style histograms.

8. A method for selectively discarding packets during a distributed denial-of-service (DDoS) attack over a network, comprising:

aggregating, in said network comprising a centralized controller and a plurality of routers forming a security perimeter, victim destination prefix lists and attack statistics associated with incoming packets received from said plurality of security perimeter routers to confirm a DDoS attack victim;

aggregating packet attribute distribution frequencies for incoming victim related packets received from said plurality of security perimeter routers;

generating common scorebooks from said aggregated packet attribute distribution frequencies and nominal traffic profiles;

aggregating local cumulative distribution function (CDF) of local scores derived from said plurality of security perimeter routers; and providing, to each of said plurality of security perimeter routers, a common discarding threshold, said discarding threshold defining a condition in which an incoming packet may be discarded at said security perimeter.

9. The method of claim 8, wherein said aggregating victim destination prefix lists and attack statistics associated with incoming packets comprises:

comparing measured attribute values to nominal traffic attribute values for packet traffic sent to a particular destination; and identifying increases in said measured attribute values over said nominal traffic attribute values.

10. The method of claim 9, wherein said confirming said DDoS attack victim comprises determining if said identified increases for said measured attribute values exceed respective predetermined thresholds.

11. The method of claim 8, wherein said victim destination prefix list and attack statistics comprise at least one of packets per second (pps), bits per second (bps), flow counts, and flow rates of incoming packets.

12. The method of claim 8, wherein said aggregating packet attribute distribution frequencies for incoming victim related packets comprises:

receiving packet attribute distribution frequencies from said plurality of security perimeter routers, said packet attribute distribution frequencies including incoming packet attribute information comprising at least one of: IP protocol-type values, packet size, source/destination port numbers, source/destination IP prefixes, Time-to-Live (TTL) values, IP/TCP header length, TCP flag combinations, use IP fragmentation, and incorrect packet protocol checksums.

13. The method of claim 8, wherein said aggregating packet attribute distribution frequencies for incoming victim related packets comprises:

receiving packet attribute distribution frequencies from said plurality of security perimeter routers routers, said packet attribute distribution frequencies including incoming packet attribute information comprising joint distribution of the fraction of packets having various combinations of Time-to-Live (TTL) values and source IP prefix, packet-size and protocol-type, and destination port number and protocol-type.

14. The method of claim 13, wherein said receiving packet attribute distribution frequencies comprises receiving iceberg-style histograms comprising said incoming packet attribute information.

15. The method of claim 8, wherein said generating common scorebooks comprises:

computing partial scores of different attributes; and computing a weighted sum of said partial scores to yield a logarithmic function of conditional legitimate probability for each incoming packet.

16. The method of claim 8, wherein said common discarding threshold comprises:

performing a load-shedding algorithm to determine a fraction ($\%_{PD}$) of arriving suspicious packets required to be discarded; and performing an inverse lookup on the aggregate CDF of scores.

17. The method of claim 16, where at each of said plurality of security perimeter routers, said method further comprises:

determining whether a score of an incoming packet is less than or equal to said discarding threshold;

discarding said incoming packet in an instance said score is less than or equal to said discarding threshold; and forwarding said incoming packet for routing to destination in an instance said score is greater than to said discarding threshold.

18. A method for selectively discarding packets at a security perimeter of a network during a distributed denial-of-service (DDoS) attack over said network, comprising:

sending, from each of a plurality of routers forming said security perimeter, victim destination prefix list and attack statistics associated with incoming packets to a centralized controller adapted to confirm a victim of said DDoS attack;

sending, from each of said plurality of security perimeter routers, packet attribute distribution frequencies for incoming victim related packets;

receiving, at each of said plurality of security perimeter routers from said centralized controller, common scorebooks formed using aggregated packet attribute distribution frequencies and nominal traffic profiles;

sending, from each of said plurality of security perimeter routers, a local cumulative distribution function (CDF) of scores to said centralized controller; and discarding, at each of said plurality of security perimeter routers, incoming packets based on a commonly distributed discarding threshold defined by said centralized controller.

19. The method of claim 18, further including the step of classifying said incoming packets as being one of suspicious and non-suspicious packets based on a destination address of said incoming packet.

20. The method of claim 19, wherein said local victim destination prefix list and attack statistics comprise at least one of packets per second (pps), bits per second (bps), flow counts, and flow rates of incoming packets.

21. The method of claim 19, wherein said sending packet attribute distribution frequencies comprises monitoring packet attribute distribution frequencies including incoming packet attribute information comprising at least one of IP protocol-type values, packet size, source/destination port numbers, source/destination LP prefixes, Time-to-Live (TTL) values, IP/TCP header length, TCP flag combinations, use IP fragmentation, and incorrect packet protocol checksums.

22. The method of claim 21, wherein said packet attribute distribution frequencies are sent in a form of iceberg-style histograms.

23. The method of claim 20, wherein said sending a local cumulative distribution function (CDF) of scores comprises:

determining a predetermined number of incoming packets to monitor;

for each incoming packet of said predetermined number of incoming packets:

determining attribute scores from said received scorebooks; and locally aggregating said scores; and forming said CDF from said aggregated scores associated with said predetermined number of incoming packets.

24. The method of claim 19 wherein said commonly distributed discarding threshold comprises:

a fraction ($\%_{PD}$) of arriving suspicious packets associated with an aggregated CDF from all of said routers.

25. The method of claim 23, wherein said discarding said incoming packets comprises:

determining whether a score of an incoming packet is less than or equal to said discarding threshold;

discarding said incoming packet in an instance said score is less than or equal to said discarding threshold; and forwarding said incoming packet for routing to destination in an instance said score is greater than to said discarding threshold.

26. A centralized controller for determining packets to be dropped in regard to a potential distributed denial-of-service (DDoS) attack at a location within a packet network, said centralized controller comprising:

means for aggregating a plurality of packet attribute values respectively received from a plurality routers forming a security perimeter of a network to confirm said attack at said location, wherein said centralized controller is associated with said network;

means for computing an aggregate conditional probability measure for each packet entering said location based on selected attributes included within said packet from each location;

means for computing an aggregate cumulative distribution function (CDF) based on said computed aggregate conditional probability measures;

means for determining a drop threshold based on access to said cumulative probability function; and means for sending said drop threshold to each of said plurality of security perimeter routers, wherein each of said plurality of security perimeter routers is adapted to pass through packets, that exceed said determined drop threshold, to said location.

27. A centralized controller for determining packets to be dropped in regard to a potential distributed denial-of-service (DDoS) attack at a location within a packet network, said centralized controller comprising:

means for aggregating, local victim destination prefix lists and attack statistics associated with incoming packets received from a plurality of routers of a network forming a security perimeter in said network, to confirm a victim of said DDoS attack, wherein said centralized controller is associated with said network;

means for aggregating packet attribute distribution frequencies for incoming victim related packets received from said plurality of security perimeter routers;

means for generating common scorebooks from said aggregated packet attribute distribution frequencies and nominal traffic profiles;

means for aggregating local cumulative distribution function (CDF) of the local scores derived from said plurality of security perimeter routers; and means for providing, to each of said plurality of security perimeter routers, a common discarding threshold, said discarding threshold defining a condition in which an incoming packet may be discarded at said security perimeter.

28. A network comprising:

a centralized controller for determining packets to be dropped in regard to a potential distributed denial-of-service (DDoS) attack at a location within a packet network; and a plurality of security perimeter routers wherein each of said security perimeter routers comprises:

means for sending victim destination prefix lists and attack statistics associated with incoming packets to said centralized controller adapted to confirm a victim of said DDoS attack;

means for sending to said centralized controller packet attribute distribution frequencies for incoming victim related packets;

means for receiving, from said centralized controller, common scorebooks formed by aggregated packet attribute distribution frequencies and nominal traffic profiles;

means for sending a local cumulative distribution function (CDF) of scores to said centralized controller; and means for discarding incoming packets based on a commonly distributed, to said plurality of security perimeter routers, discarding threshold defined by said centralized controller.

* * * * *